(No Model.) 7 Sheets—Sheet 3.
J. A. BRILL & W. S. ADAMS.
MOTOR TRUCK.
No. 493,234. Patented Mar. 7, 1893.
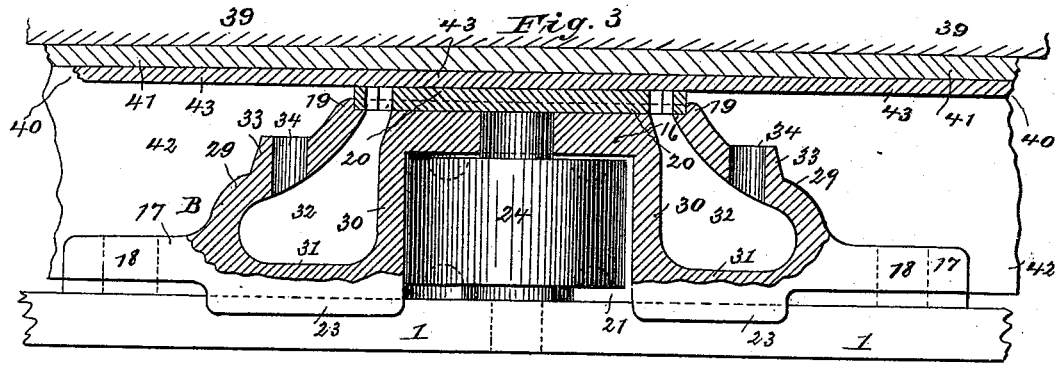
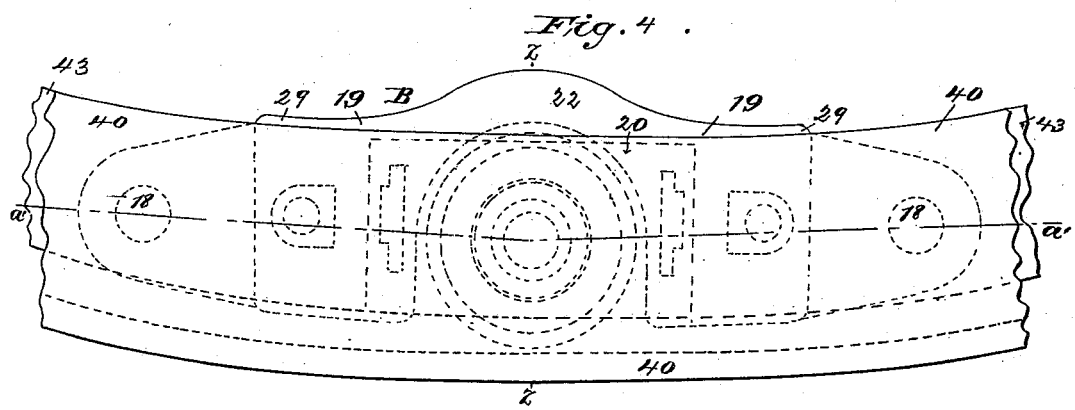
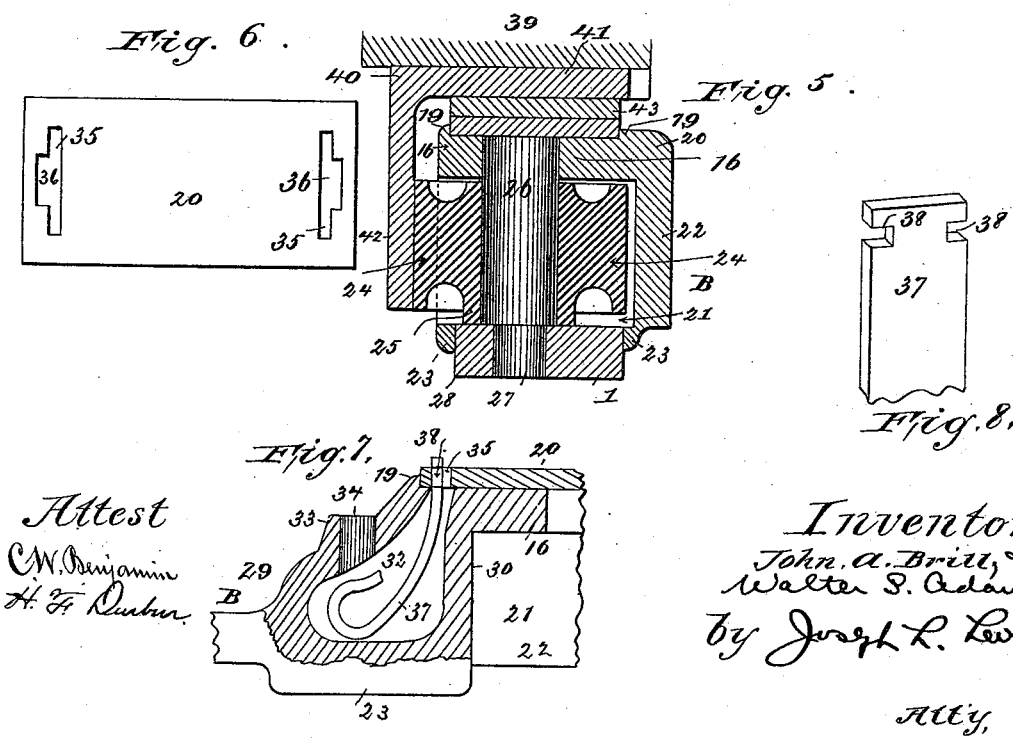
Attest
C. W. Benjamin
H. F. Dunbar
Inventors,
John A. Brill, &
Walter S. Adams
by Joseph L. Levy
Atty.

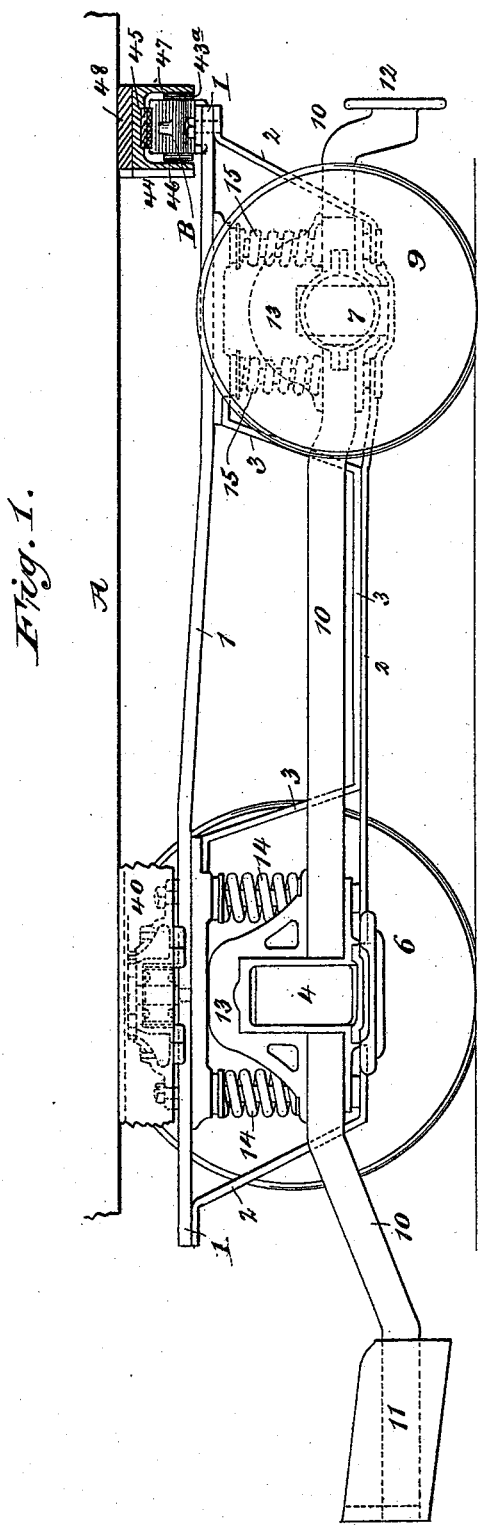

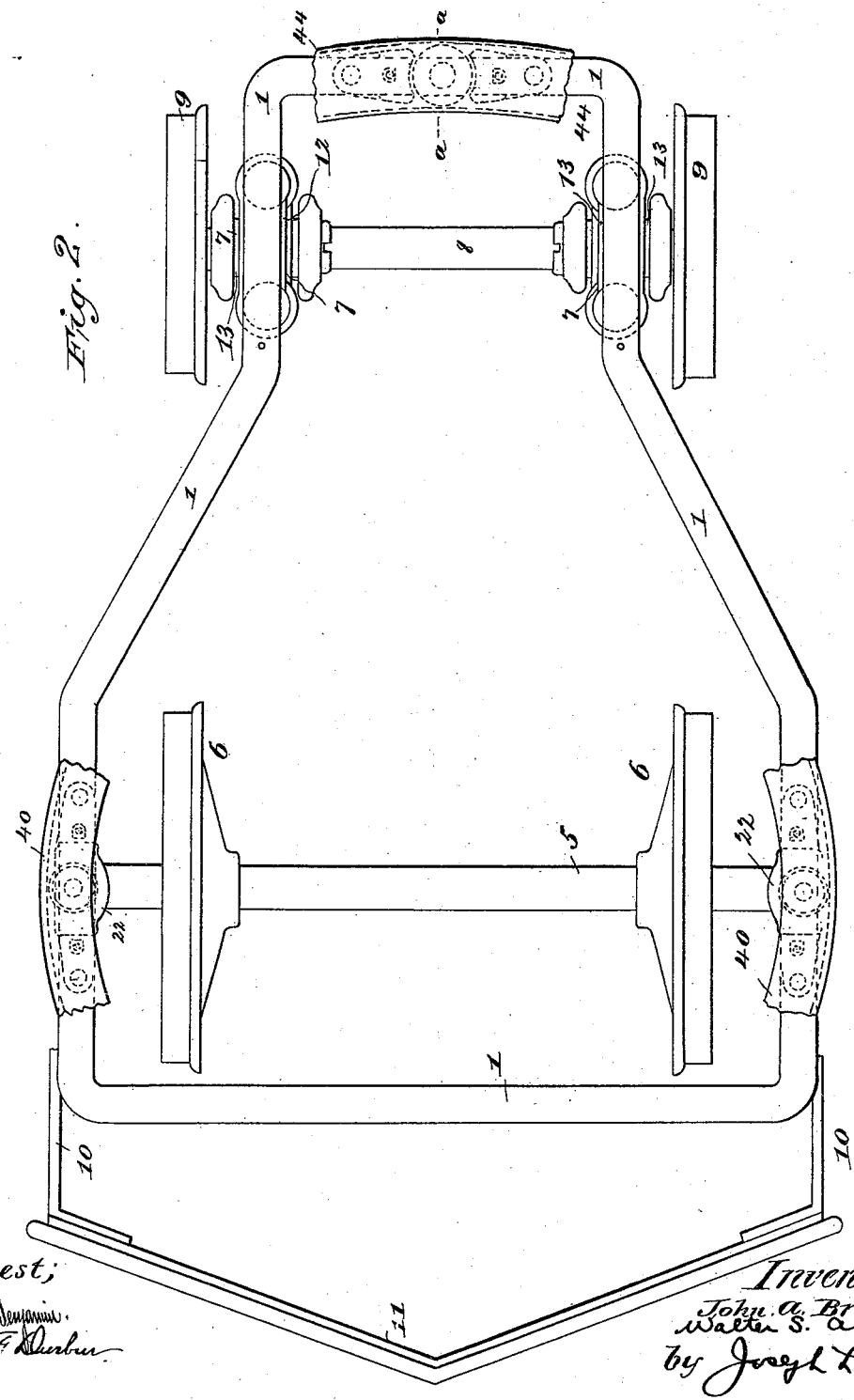

(No Model.) 7 Sheets—Sheet 4.
J. A. BRILL & W. S. ADAMS.
MOTOR TRUCK.
No. 493,234. Patented Mar. 7, 1893.
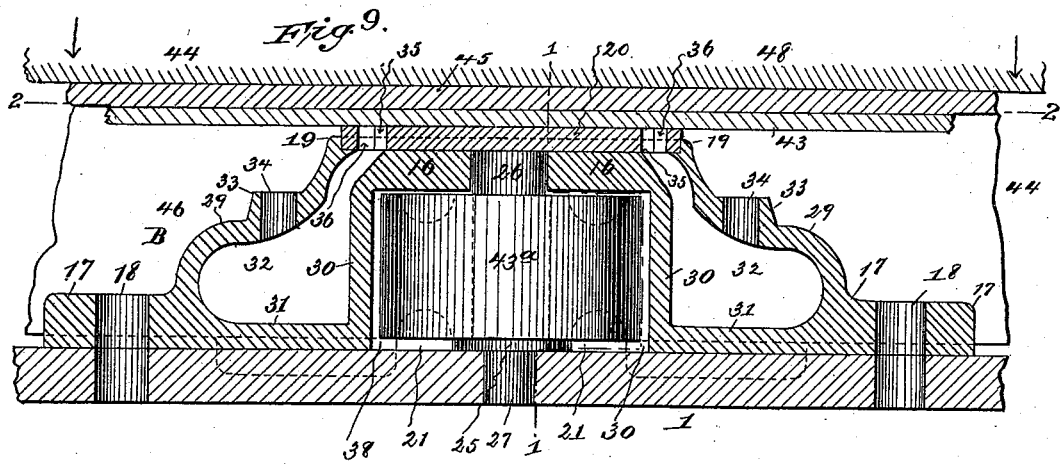
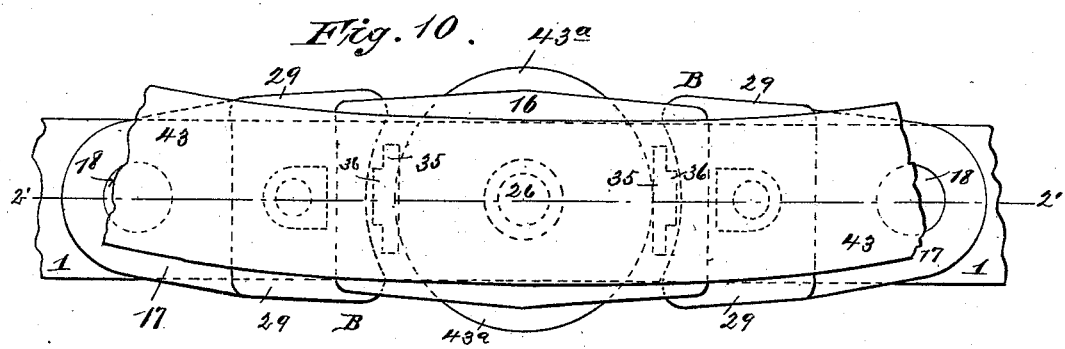
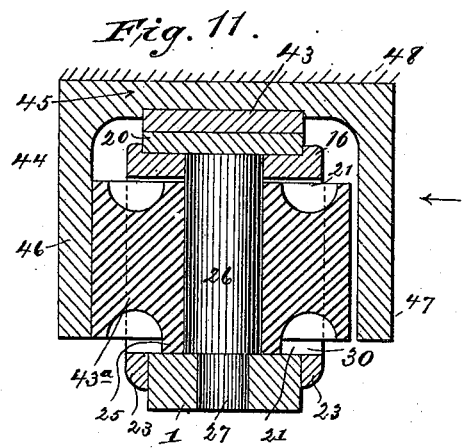

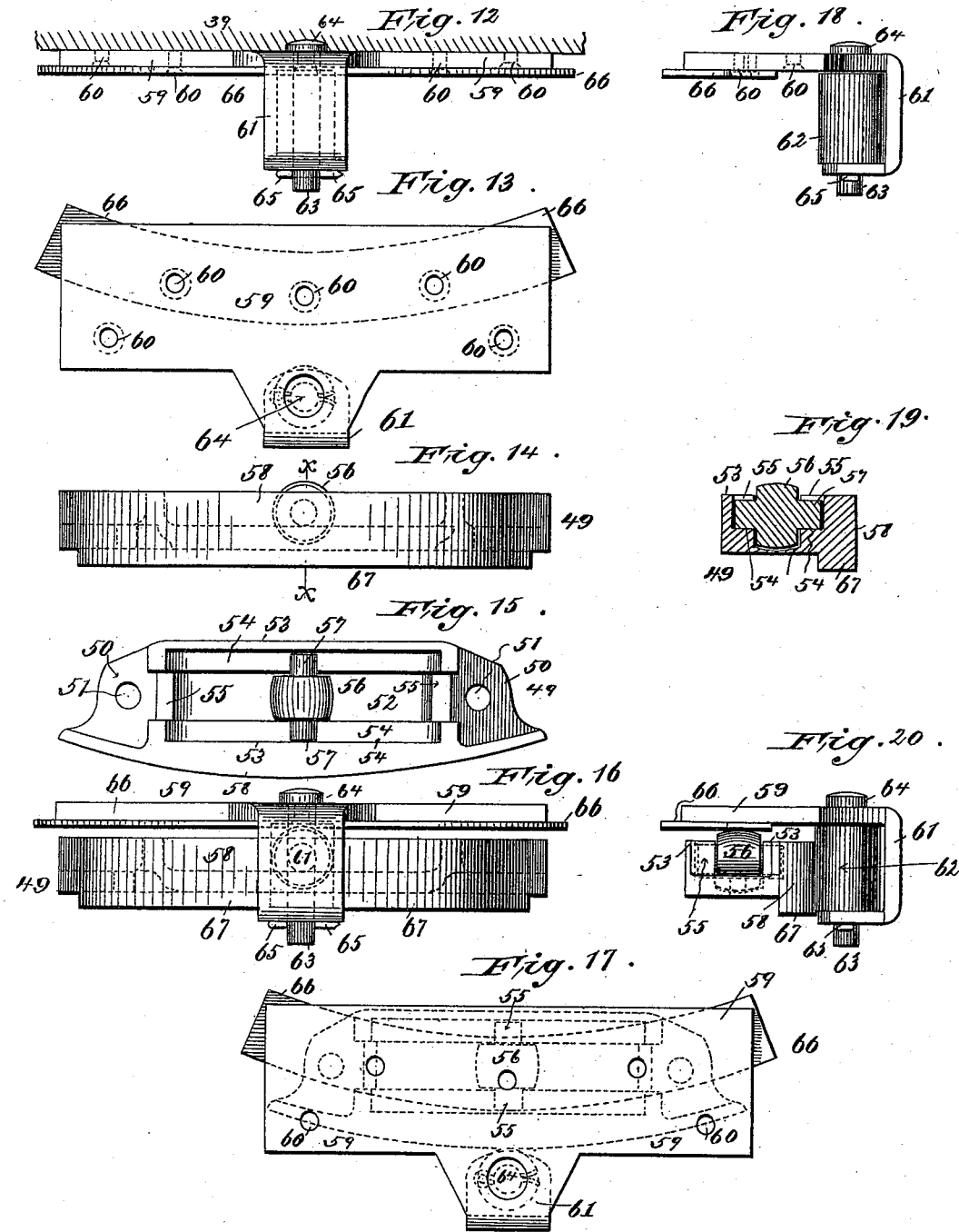

(No Model.) 7 Sheets—Sheet 6.
J. A. BRILL & W. S. ADAMS.
MOTOR TRUCK.
No. 493,234. Patented Mar. 7, 1893.
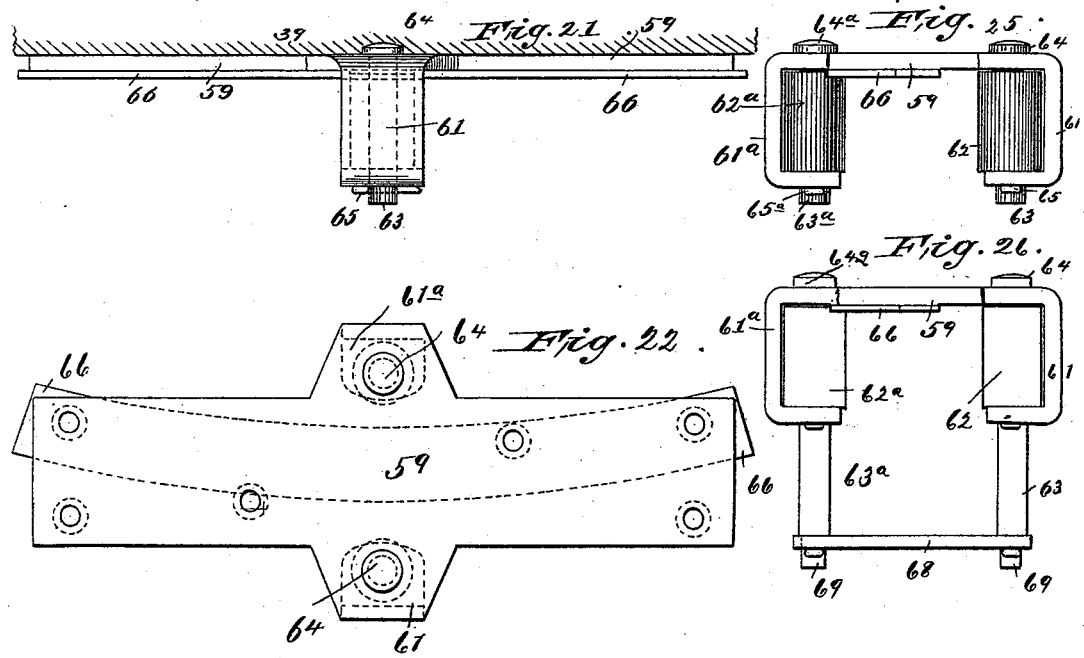
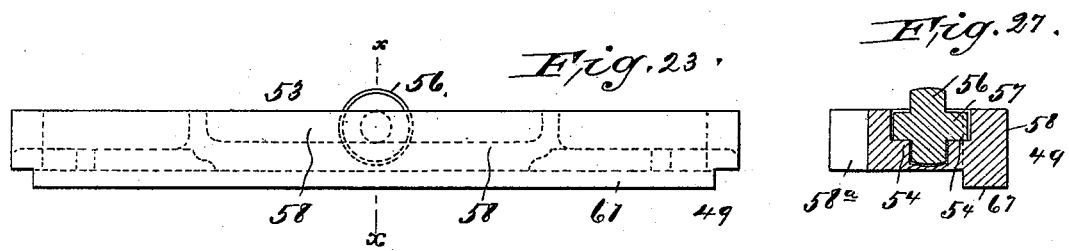
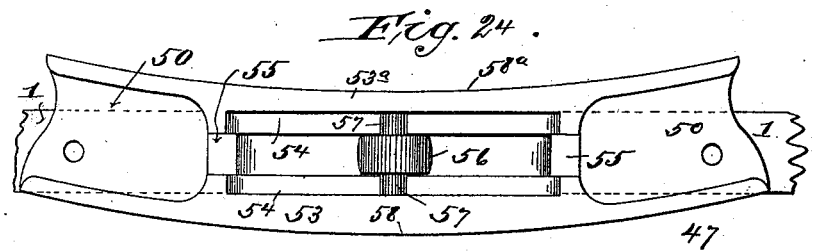

(No Model.) 7 Sheets—Sheet 7.
J. A. BRILL & W. S. ADAMS.
MOTOR TRUCK.
No. 493,234. Patented Mar. 7, 1893.
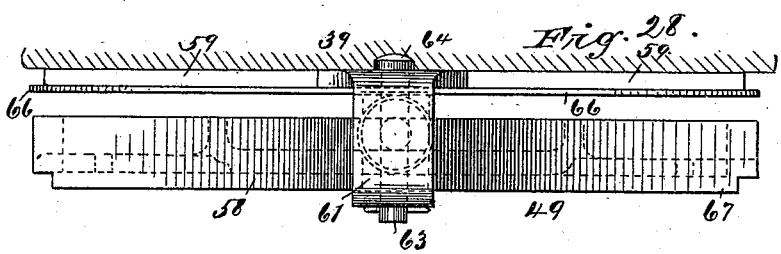
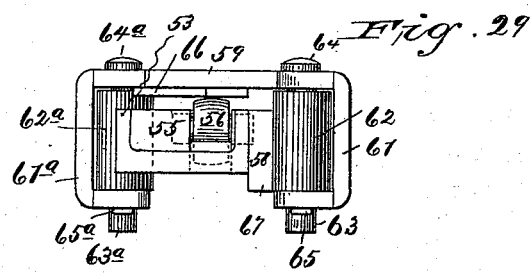
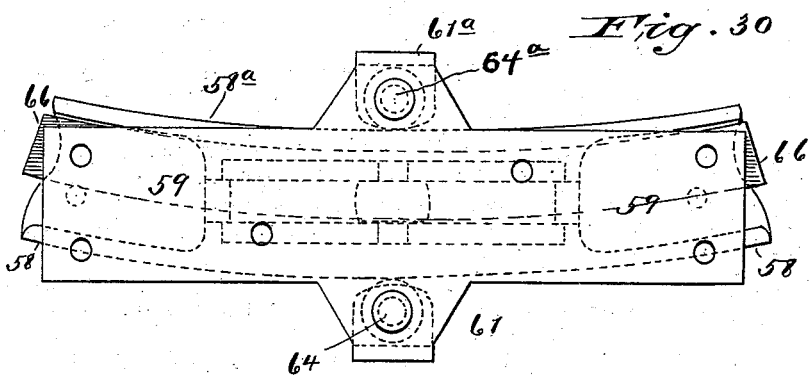

UNITED STATES PATENT OFFICE.

JOHN A. BRILL AND WALTER S. ADAMS, OF PHILADELPHIA, PENNSYLVANIA; SAID ADAMS ASSIGNOR TO SAID BRILL.

MOTOR-TRUCK.

SPECIFICATION forming part of Letters Patent No. 493,234, dated March 7, 1893.

Application filed August 2, 1892. Serial No. 441,984. (No model.)

*To all whom it may concern:*

Be it known that we, JOHN A. BRILL and WALTER S. ADAMS, citizens of the United States of America, and both residing at Philadelphia, county of Philadelphia, State of Pennsylvania, have invented certain new and useful Improvements in Motor-Trucks, of which the following is a specification.

Our invention relates to pivotal or swiveling car trucks, adapted to carry an electric motor or cable grip.

The object of our invention primarily is to provide a truck with a clear open space between the truck frame wherein a motor can be placed, for the purpose of increasing the facility in handling the motor; also a structure wherein a portion thereof is enabled to keep the track more completely, or to prevent climbing as it is called, and provide new devices for the purpose of pivotally uniting the car body and truck.

To accomplish one of the objects, to wit: a clear and open space, we entirely eliminate the usual bolster member and center bearing or king bolt, and cause the pivotal union of the car and truck to be made by side bearings and rub plates located on the top of the truck frame and on the car body, which secures the swiveling capacity of the truck and car body. Further, we place a rub plate upon the end of the truck and connect it with suitable devices on the car body, enabling the truck to draw or be drawn from the end, which relieves the side bearings of any strain due to the moving of the truck, the side bearings being primarily the pivot plates, while the end bearing acts primarily as a draw head to move the truck or car along.

A form of truck to which we have applied our invention is of that class which is provided with large and small wheels, the large wheels being called the driving wheels, and the small wheels the trailing wheels, in which structure the pivotal center has usually been located approximately over the center of the axle of the driving wheel upon which an electric motor for driving the truck has been secured, and to which the motive power has been applied, the object in that case being to preponderate the weight of the car on the driving wheel, so as to increase the traction of the truck and take the greater portion from the trailing wheels upon which very little of the weight of the superposed car body falls.

Another feature of the present construction lies in locating the end bearing outside or to the rear of the wheel base or point of contact of the small wheel on the rail. When so located, the tendency of the drawing action of the end bearing, whether the truck is drawing or being pulled, is to keep the small or trailing wheels down on the track; and this tendency will be present, whether a portion of the weight of the car is taken upon the end bearing or not.

It must be understood that in general use there are two trucks under a single car, so that the apportioned weight will be supported on the side bearings of each truck at both ends of the car.

The class of truck of this character is shown in an application filed by me on March 1, 1892, Serial No. 423,343, which structure also embodies the additional feature of narrowing the truck frame at the trailing end and placing it within the trailing wheels, so as to provide against the trucks striking against the car steps wherein, also, a shorter wheel base truck is obtained by reason of the support for the free end of the motor being located close up to the axle of the trailing wheels.

In trucks of this class with or without the narrowed frame there is a tendency of the trailing wheel to climb the rail, and for this reason it has been disadvantageous to place the pivotal center directly over the center of the driving wheel axle. This tendency is present when the truck is moving with the driving wheels forward, and is increased when the truck moves with the trailing wheels forward; but the tendency is always less when the small wheels are trailing.

In the present structure, however, the small wheels are forced to keep to the track whether they lead or trail, and when the truck is moving with the small wheels forward they still can be said to be trailing, by reason of the fact that the truck or car is drawn from the trailing end, and, as before stated, when trailing they have the least tendency to climb. It will be seen that this tendency is reduced to a minimum, if not entirely obliterated, by reason of the tendency of the end bearing to keep the small wheels down on the track from the drawing effort. There is, therefore, practically no disposition whatever for the small wheels to climb the track, no matter what direction the truck moves in. The tendency of the driving end of the truck to lift the trailing end due to a preponderance of the weight on the driving end is thereby counterbalanced.

Our invention, we consider, is broad enough to cover all classes of pivotal trucks, whether large or small wheels are used, or whether the pivotal center is located off the center or not; and when motive power is applied to the truck itself, as it is intended in the present case, the same advantages will be present, although instead of the truck being drawn by the car, the car is drawn by the truck.

Our invention also extends to the structure of both the end and side bearings, in which we have employed the combination of sliding and rolling instrumentalities with lubricating devices, which will be hereinafter more fully set forth.

In the drawings forming part of this specification Figure 1 is a side elevation, showing a truck and a portion of the car body with our improvements attached thereto, the end rub plate being partly in section, taken on the line $a\ a$, Fig. 2. Fig. 2, a plan view thereof with the car body removed. Fig. 3, an enlarged side elevation, partly in section, of one of the side bearings, said section being taken approximately on the line $a'\ a'$, Fig. 4, certain parts thereof being broken away to save space in illustrating. Fig. 4, a plan of Fig. 3, parts being broken away for a like purpose. Fig. 5, a sectional elevation, taken on the line $z\ z$, Fig. 4. Fig. 6, a plan view of the friction plate. Fig. 7, a sectional elevation of one end of the bearing showing the oil well, friction plate, and the conducting wick therein. Fig. 8, a detached view of one end of the conducting wick. Fig. 9, a sectional elevation of the end bearing, taken approximately on the line $2'\ 2'$, Fig. 10. Fig. 10, a plan view of Fig. 9 below the line 2, 2, Fig. 9, looking in the direction of the arrows. Fig. 11, a sectional elevation, taken approximately on the line 1 1, Fig. 9, the roller being in section. Figs. 12 to 30 inclusive, comprise various views of a modified form of side and end bearing, and may be described as follows without numerical consecutiveness: Fig. 16, a side elevation of the end bearing, showing the car and truck elements combined. Fig. 20, an end elevation, and Fig. 17, a plan view of the same, the truck element being shown in Fig. 17 in dotted lines. Fig. 12, a side elevation of the detached car element, and Figs. 18 and 13, end elevation and plan view, respectively. Fig. 14, a side elevation of the truck element. Fig. 19, a sectional elevation, taken on the line $x\ x$, Fig. 14, and Fig. 15, a plan of Fig. 14. Fig. 21, a side elevation of the detached car element of the end bearing. Fig. 25, an end elevation of Fig. 21. Fig. 22, a plan view of Fig. 21. Fig. 23, a side elevation of the truck element. Fig. 27, a sectional elevation, taken on the line $x\ x$, Fig. 23. Fig. 24, a plan view of Fig. 23, and Fig. 26, a modification of the structure shown in Figs. 21, 22, and 25. Fig. 28, a side elevation of the end bearing, showing the truck and car elements combined. Fig. 29, an end elevation of Fig. 28. Fig. 30, a plan view of Fig. 28.

Similar letters and figures refer to like parts throughout the several views.

In the accompanying drawings A represents the car body or one of its sills; 1, the upper chord of the truck; 2, the lower chord thereof; 3, intermediate bracing; 4, the axle boxes for the large or driving wheels; 5, the driving axle; 6, the driving wheels; 7, the journal bearings for the axle 8 of the small or trailing wheels 9; 10, the side bars of the axle box frame, and 11 and 12 life guards or fenders attached thereto; 13, the axle box saddles to which the side bars 10 are secured; 14, the truck springs about the driving wheels, and 15, the truck springs about the trailing wheels. Both sets of springs surround spring posts in the usual way, which in this case extend up through the upper chord and through apertures 18 in the lugs 17 of the castings B, and, by means of nuts on the top of the spring posts, securing said castings down upon the upper chord.

The structure of the truck is substantially the same as that shown in our application for Letters Patent before referred to, the one substantial difference being the omission of the truck bolster and center bearing, and a support for the free end of the motor, and the difference in the means for pivotally uniting the truck and car, and in the drawing devices. In that application the advantages of this particular type of truck is set forth, and to which cross reference is here made for the details thereof.

We shall hereinafter refer to those parts of the present structure which are attached to the car and which co-operate with the bearings on the truck, as side and end rub plates, respectively and those bearings which are secured to the truck, as the side bearings, and that which is secured to the trailing end of the truck frame, as the end bearing, it being understood that the combined end bearing and end rub plate are adapted in all the structures shown herein to pull the car when motive power is applied to the truck, and to pull the truck when motive power is applied to the car.

The construction of the side bearing and side rub plate, that is, those elements which are secured to the side of the truck frame, and to the car, as before described, are shown in Figs. 3 to 8 inclusive.

The side bearing comprises a casting B having a central section or web 16 and outwardly extending wings or lugs 17 provided with holes 18, (dotted lines, Fig. 4) through which bolts are to pass to secure the side bearing to the upper chord 1 of the truck. At the top of the central web 16 is formed a rectangular recess about which is formed the boss 19, in which recess is placed the friction plate 20. Below the web 16 of the central enlargement is formed a recess 21, which is open on the outside of the truck and closed by the segmental wall 22 at the rear or within the truck. The side bearing is also provided with horizontal lips or lugs 23, which serve to keep the side bearing steady on the upper chord of the truck and restrain it from transverse movement. An anti-friction roller 24, having an extended hub 25, is rotatively supported within the recess 21 by the spindle 26, which has upper bearings in the web 16, the lower portion of the spindle being reduced in diameter, as at 27, by which a shoulder 28 is formed thereon, the spindle extension 27 finding bearings in the upper chord 1, the shoulder 28 of the spindle resting on the top of the upper chord. The spindle 26 is free to rotate in its bearings and the roller 24 is likewise free to rotate about the spindle, and the roller is set so as to cause a portion of it to protrude out from the casting B and beyond the upper chord 1 of the truck. The casting B is also provided with an inclined wall 29, and a perpendicular wall 30 joins the central web 16 and the bottom web 31 of the casting, and between the walls 29, 30 and web 31 is formed an aperture 32 which is used as an oil reservoir. The wall 29 is provided with a boss 33, through which extends an opening 34, leading down into the reservoir 32, so as to give access from the outside for filling the reservoir. The aperture 32 passes up through the web 16 and opens into the recess, upon which the friction plate 20 rests. The friction plate is provided with a transverse slot 35 and with an extension 36 thereto, both the slot and extension aligning with the upper portion of the recess 32, the inner edge of the slot 35 preferably aligning with the inner edge of the aperture 32, and the outer edge of the slot extension 36 preferably aligning with the outer edge of said recess.

In Fig. 7 is shown the oil reservoir and friction plate with a wick 37 therein, which wick has two notches 38 in its side near the top thereof, which notches are adapted to engage the slot extension 36 in the plate 20, whereby the wick is held in the friction plate, so as to keep its surface lubricated. The upper portion of the wick preferably extends up above the top surface of the friction plate.

The side rub plate (that is, the car element) is composed as follows: To one of the sills 39 of the car body, or to any other convenient member thereof, is secured an angle iron 40 which is disposed in the arc of a circle. The angle iron 40 has a horizontal web 41 and a vertical web or side 42, the horizontal web being secured to the sill, &c. of the car body, as before set forth, and the vertical web extending downward therefrom. To the under side of the horizontal web 41 is secured a top friction plate 43, which is disposed in the same manner as the angle iron 40, and rests upon the lower friction plate 20, and against the upper friction plate, the upper portion of the wick 37 rests. The angle iron 40 is bolted to the car body in such a manner, as to bring the vertical web 42 in contact with the roller 24, as shown in Fig. 5. The dimensions of the angle iron 40 should be such, as to permit the car to swivel on the truck, and under normal conditions to cause the vertical web or side 42 of the angle iron to bear on the roller 24, and the friction plate 43 should be of such a length, to permit it to bear upon the friction plate 20 during all the normal evolutions of the truck and car body in turning curves.

The friction rollers 24 being confined within the circular or segmental plane would of themselves be sufficient for drawing either the car body, if the motive power is applied to the truck, or the truck if the motive power is applied to the car body; but for the purpose of positively drawing either the car body or truck, and for the other purposes hereinbefore set forth, we place upon the rear or trailing end of the truck and preferably outside of the wheel base thereof, devices for both pivotally connecting the car body and the truck and for drawing the car body from the truck, or vice versa, as follows: The structure of the end bearing is substantially the same as the side bearings, with the exception that the aperture 21 extends entirely through the bearing, as shown more plainly in Fig. 11, and the roller 43ᵃ is larger than the roller 24 and extends out through said aperture past the upper chord 1 on both sides thereof. The method of securing the spindle 26 and extension 27 with the central web 16 of the bearing and to the upper chord 1, and the mode of securing the shoulder 28 upon the spindle 26 is the same as that set forth in regard to the side bearings. For the end rub plate, (that is, the car element) instead of using an angle iron, such as 40, we use a channel iron 44, which has the horizontal web 45 and vertical webs or sides 46, 47. The channel beam 44 is disposed in the arc of a circle struck from the pivotal center of the truck, and has secured thereto a friction plate 43 preferably disposed in the same arc, which friction plate is similar to the friction plate 43 in the side rub plate. The channel beam is secured to the bolster beam 48, Fig. 1, which is secured to the longitudinal members of the car body, and which acts as a riser to make up for the lack of height of the end bearing, which is due to the depression of the truck frame at this end, and also makes a firm union of the same to the car body and strengthens it.

By the device just described we form a pivotal bearing between the car body and truck and also a device for enabling the truck to be drawn from the car, or the car from the truck.

A modified form of side and end bearings is shown in Figs. 12 to 30 inclusive, and is constructed as follows: The truck side bearing and side rub plate are shown in Figs. 12 to 20 inclusive. The side bearing (the truck element) comprises a casting 49, elongated in shape, and having extensions 50 in which are bolt holes 51 for securing the casting on the upper chord or top member of the truck. The casting is provided with a longitudinal depression or groove 52 having walls 53, in which races or guide ways 54 are formed. At the ends of the groove 52 are upwardly extending lugs 55. A roller 56 having, the spindle 57, extending outwardly therefrom on both sides, projects down into the well 52, the spindle resting on the races 54. The outer edge of the casting 49 is made segmental in form, as shown at 58, to permit the car to swivel thereon.

The car side rub plate comprises a flat rectangular plate 59 provided with bolt holes 60, by which it is secured to the longitudinal member or sill 39 of the car, and has an outwardly and downwardly extending bracket 61, within which bracket is located a roller 62 rotatively supported upon the spindle 63 preferably of bolt form, having the enlarged head 64 resting on the bracket, and split pin 65 for preventing the displacement of the spindle, the spindle passing through the bracket and free to turn therein, and through the roller 62 which is free to turn thereon. A friction plate 66 preferably segmental is secured in any suitable manner to the rectangular plate 59, and when the parts are assembled, as in Figs. 16, 17 and 20, the friction plate 66 bears on the top of the roller 56, and the roller 62 bears against the segmental bearing surface 58. The friction plate 66 and roller 56 form an anti-friction bearing between the car body and truck, the travel of the roller 56 in the races 54 being much less than the movement of the friction plate 66 thereon; while the engagement of the roller 62 and segmental bearing surface 58 pivotally unites the car body with the truck, and, as in the preferred structure before described, will under ordinary circumstances be sufficient for drawing the car, or vice versa. The segmental bearing surface 58 may be extended down below the bottom of the casting to form a lug 67, which embraces the side of the upper chord or top member of the truck, and assists the attaching bolts in preventing a lateral movement or dislodgment of the casting. The lug 67, however, may be made independent of the segmental surface 58.

The modified form of end rub plate and end bearing is shown in Figs. 21 to 30 inclusive. This structure contains the main features of the side rub plate and side bearing just before described and shown in Figs. 12 to 20 inclusive, with the exception that the segmental surface 58 is produced on both sides of the casting 49, and that instead of the plate 59 having one bracket 61, it has two on each side thereof, the inner one, which is in the case of the end rub plate marked 61ª, and all the duplicated parts are marked with a small $a$ to indicate their duplication.

In Fig. 26 the bolts 63, 63ª are continued down below the upper chord and are united laterally by a cross bar 68, which engages the ends of the bolts and keeps them together, preventing them from spreading apart. The ends of the bolts are reduced in size, as shown at 69, so as to permit the cross bar to be engaged or disengaged from the bolts, and split pins 70 are passed through the bolts and under the cross bar, for the purpose of preventing the cross bar from dropping away. Thus it will be seen that in the modified structures shown in Figs. 12 to 30 inclusive we provide devices for uniting the car body and truck, so that a pivotal connection may be had between them, and which devices permit of the car being drawn by the truck, or the truck being drawn by the car.

By the use of the herein described pivotal connections on the upper chord or the upper portion of the truck frame, we can dispense with the usual cross bolster and center bearing, and the bolster accessories, leaving the space within the truck free and clear.

By the terms "separate or unconnected pivot plates" used in the claims, we mean devices for pivotally uniting the car and truck, those on each side or end being unconnected and separate from each other.

It is apparent that many changes and alterations may be made in the structure of the device for securing a pivotal union of the car and truck for the purposes of this invention, and that such devices can be used on trucks where the wheels are of the same size, and where the pivotal center is midway between the centers of the axles, or otherwise disposed, without departing from the spirit thereof.

Having described our invention, we claim—

1. The combination of a car body and car truck, connections for pivotally uniting the car and truck located over the side frames thereof, and pivotal connections on the end of the truck frame uniting the car body and truck, substantially as described.

2. The combination of a truck having side bearings comprising stationary and movable elements for frictional contact, the bearings being secured to the truck frame, and a car body having segmental rub plates adapted to engage the side bearings, by means of which the car and truck are pivotally united, substantially as described.

3. The combination of a truck and a car body, the truck having a pivot plate secured at the end thereof, with devices on the car body for engagement with said pivot plate, such combined devices forming a pivotal connection between the car body and truck, enabling the car to be drawn by the truck, or the truck by the car, substantially as described.

4. The combination with a car and truck, of devices for securing a pivotal or swiveling union of the car and truck, said devices permitting the propelling of the car or truck to be accomplished from the end of the truck, said devices being adapted to move in the arc of a circle generated from the pivotal center of the truck, substantially as described.

5. The combination with a car and truck, of devices for securing a swiveling or pivotal union of the car and truck, such devices being movable, one in relation to the other, and secured to the truck and car without the wheel base of the truck, substantially as described.

6. A truck having an upper chord or frame, and devices for drawing a car secured to a transverse member of the upper chord at one end, said drawing devices being adapted to move transversely of the car, substantially as described.

7. The combination of a car and truck, of devices for securing a pivotal connection of the car and truck, such union being made at the sides and end of the truck, substantially as described.

8. The combination in a car and truck, of devices for pivotally uniting the car and truck disposed about and away from the pivotal center, and additional means for securing the truck and car together for propulsion of the same, substantially as described.

9. The combination in a car and truck, of devices for pivotally uniting the car and truck secured to the truck and car over the sides of the truck, and devices for securing the truck and car together for propulsion located over the end of the truck, said devices having a relative movement in the arc of a circle, substantially as described.

10. The combination in a car and truck, of devices for pivotally uniting the car and truck disposed about and away from the pivotal center thereof, and devices uniting the car and truck for propulsion situated on the end thereof and outside of the wheel base, substantially as described.

11. The combination in a car and truck pivotally connected, and additional devices which unite the car and truck together for propulsion, the union of said additional devices between the car and truck being made transversely of the truck and to one side of the pivotal center, substantially as described.

12. The combination, with a car and truck, of drawing devices between the car and truck, located over the end of the truck, the car and truck elements of said devices having a movement, one in relation to the other, substantially as described.

13. The combination, with a car and truck, of pivotal devices between the car and truck comprising a bearing secured to the truck and a segmental rub plate affixed to the car and having a depending side engaging the truck bearing on the outside thereof, substantially as described.

14. The combination, with a car and truck, of drawing devices between the car and truck comprising a segmental bearing, and a superposed segmental rub plate adapted to engage the bearing on both sides, said devices being located over the end of the truck frame, substantially as described.

15. The combination, with a car and truck, of pivotal devices between the car and truck comprising a bearing having a roller therein, and a segmental angle iron secured to the car, the depending side or angle of which is adapted to engage the roller, substantially as described.

16. The combination, with a car and truck, of drawing devices between the car and truck comprising a roller, and a segmental channel beam, the roller engaging the channel beam between the depending sides or angles thereof, said devices being located over the end of the truck, substantially as described.

17. A truck having separate or unconnected pivot plates supported on the side frame over the axle of one set of wheels, and another pivot plate on the end of the truck opposing said axle, substantially as described.

18. The combination of a car and truck, of devices for securing a pivotal or swiveling union of the car and truck comprising three bearing points on the truck and car, which are disposed about the pivotal center and generated therefrom and which permit the car to move bodily about the said pivotal center, substantially as described.

19. The truck having the separate and unconnected pivot plates disposed so as to precipitate the major portion of the truck supported weight of the car upon the axle at one end, and swiveling devices for drawing the truck at the other end, substantially as described.

20. A truck having three swiveling points of connection with a car body, two of which lie in the same arc generated from the pivotal center, the other point being adapted to move in a greater arc, substantially as described.

21. The combination, with a car and a truck, of drawing devices between the car and truck comprising a roller, a friction plate above the roller, a channel beam superposed above the friction plate and in contact therewith, the depending sides of the channel beam engaging said roller, said devices being located over the end of the truck, substantially as described.

22. The combination, with a car and a truck, of pivotal devices between the car and truck comprising a bearing having a roller, a friction plate on the bearing, a segmental channel beam having depending sides superposed over the bearing, a friction plate secured to the channel beam engaging the lower friction plate, the sides of the channel beam being adapted to bear against the roller, substantially as described.

23. The combination, with a car and truck, of pivotal devices between the car and truck comprising a segmental channel beam secured to the car and having depending sides, a friction plate within the sides and on the channel beam, and a bearing secured to the truck having a roller and superposed friction plate, and an oil well in said bearing, the two friction plates and the roller and channel beam being adapted to engage each other, substantially as described.

24. The combination, with a car and truck, of pivotal devices between the car and truck comprising a bearing secured to the truck, having a friction plate, and a segmental angle iron secured to the car having a friction plate, the friction plates being superposed, and the side of the angle iron being adapted to engage the truck bearing, substantially as described.

25. The combination, with a car and truck, of pivotal devices between the car and truck comprising a bearing secured to the truck having a roller and a friction plate, a segmental angle iron secured to the car having a friction plate, the friction plates being superposed, the angle iron being adapted to engage the roller, substantially as described.

26. The combination, with a car and truck, of pivotal devices between the car and truck comprising a bearing on the truck having a roller, a friction plate and an oil well adjacent to the friction plate, and an angle iron secured to the car having a friction plate both plates being superposed, the roller and angle iron being adapted to engage each other, substantially as described.

27. The combination, with a car and truck, of separate or unconnected pivot plates between the car and truck, located directly over the side frames of the truck and to one side of the wheel base center thereof, substantially as described.

28. The combination, with a car and truck, of separate or unconnected pivot plates between the car and truck, located directly over the side frames of the truck and over the axle of one set of the wheels, substantially as described.

29. A truck without a transversely extending center bearing bolster, having separate or unconnected pivot plates supported on the side frames to one side of the wheel base center, substantially as described.

30. A truck without a transversely extending center bearing bolster, having separate or unconnected pivot plates supported on the side frames over the axle of one set of wheels, substantially as described.

31. The combination, with a car and truck, of separate or unconnected pivot plates between the car and truck, supported upon the side frames and end frame of the truck, substantially as described.

32. The combination, with a car and truck, of separate and unconnected pivot plates between the car and truck, located over the axle of one set of wheels, and over the end of the truck, substantially as described.

33. The combination, with a car and truck, of separate and unconnected pivot plates between the car and truck, located over the axle of one set of wheels, and over the end of the truck without the wheel base thereof, substantially as described.

34. The combination, with a car and truck, the truck having large and small wheels, and separate and unconnected pivotal devices between the car and truck located over the axle of the large wheels, substantially as described.

35. The combination, with a car and truck, the truck having large and small wheels, pivotal devices between the car and truck located over the axle of the large wheel, and an end bearing between the car and truck over the small wheel end of the truck, substantially as described.

36. The combination, with a car and truck, the truck having large and small wheels, pivotal devices between the car and truck located to one side of the wheel base center of the truck, and drawing devices having pivotal connection with the car and truck at the small wheel end of the truck, substantially as described.

37. The combination, with a car and truck, the truck having large and small wheels, pivotal devices between the car and truck located to one side of the wheel base center of the truck, and drawing devices having pivotal connection with the car and truck located without the wheel base of the truck, substantially as described.

38. The combination, with a car and truck, the truck having large and small wheels, pivotal devices between the car and truck located over the axle of the large wheels, and drawing devices having pivotal connection with the car and truck located at the small wheel end of the truck, substantially as described.

39. The combination, with a car and truck, the truck having large and small wheels, pivotal devices between the car and truck located over the axle of the large wheels, and drawing devices having pivotal connection with the car and truck located without the wheel base of the truck, substantially as described.

40. The combination, in a car and truck, of a truck having rotatable instrumentalities secured on the top frame thereof, and segmental plates secured to the car body having depending sides adapted to engage the rotatable instrumentalities on the truck, substantially as described.

41. The combination, in a car and truck, of a truck having bearing instrumentalities secured on the top frame thereof, and segmental plates secured to the car having depending sides adapted to engage the bearing instrumentalities, substantially as described.

42. The combination, in a car and truck, of a truck having bearings secured on the top frame thereof, said bearing having a friction plate, and segmental plates secured to the car having depending sides adapted to engage the bearing, and a friction plate on the segmental plate adapted to engage the bearing friction plate substantially as described.

43. The combination, in a car and truck, of a truck having bearings secured on the top frame thereof, said bearing having a friction plate and a contained oil reservoir combined with the friction plate, and segmental plates having depending sides secured to the car and adapted to engage the bearing, and a friction plate on the car element in engagement with the bearing friction plate, substantially as described.

44. The casting B, having the central web 16, extensions 17, oil wells 32 between the extensions and central web, and an apertured friction plate 20 in the central web, the apertures of which align with the wells, substantially as described.

45. The casting B, having the superposed friction plate 20, apertures in said plate adjacent to its ends, and independent oil wells 32, aligning with said apertures, substantially as described.

46. The combination, with the casting B having the roller 24, of the angle iron 40, having the depending angle 42 adapted to engage the roller, substantially as described.

47. The casting B, having the extensions 17, bolt holes 18 therein and a depending flange 23, combined with the upper chord 1, the said flange embracing the upper chord, substantially as described.

48. The casting B, having the central web 16, and extensions 17, the oil wells 32 adjacent to the web and on both sides thereof, and apertures 34 leading from without the casting to the said wells, substantially as described.

49. The casting B, having a superposed friction plate 20 with transverse slots adjacent to the ends thereof, and an oil supply and wick leading to said slots, substantially as described.

50. The casting B, having a superposed friction plate 20 with transverse slots 35 adjacent to the ends thereof, the independent oil wells 32 with openings aligning with the slots, and a wick 37 in each well extending through said slots, substantially as described.

51. The casting B, having a superposed friction plate 20 with transverse slots 35 and slot extensions 36 adjacent to the ends thereof, the independent oil wells 32 with openings aligning with the slots, and a wick 37 having the recesses 38 in each well, the recesses engaging the slot extensions, substantially as described.

52. The combination, with the casting B having the rotatively supported roller 24 and the superposed friction plate 20, of the independently supported angle iron having the depending web 42, the roller and friction plate being adapted to engage the angle iron, substantially as described.

53. The combination, with the casting B having the rotatively supported roller 24 and the bearing friction plate 20, of the independently supported angle iron having the depending web 42 and attached rub friction plate 43, the friction plates, web and roller being engaged, substantially as described.

54. The combination, with the casting B having the roller 24 and bearing friction plate 20, of the superposed rub plate 40, segmental in form, and adapted to engage the roller and friction plate, substantially as described.

55. The combination, with the casting B having the roller 24 and bearing friction plate 20, of the superposed rub plate 40 having the rub friction plate 43, the rub plate being segmental in form, the friction plates, roller and rub plate being engaged, substantially as described.

56. The combination, with the casting B having the roller 24, oil wells 32, and bearing friction plate, apertures in the said rub plate aligning with the oil wells, a conductor leading to the friction plate, of the superposed rub plate 40 segmental in form having the rub friction plate 43, the friction plates, roller and rub plate being engaged, substantially as described.

57. The combination, in a car and truck, of the truck bearing, the car rub plate, and the added bolster 48 between the car and rub plate, substantially as described.

58. The combination, with a truck bearing having a roller, of an independently supported rub plate having depending webs and segmental in form adapted to engage the roller between the webs, substantially as described.

59. The combination, with a truck bearing having a roller and superposed friction plate, of an independently supported rub plate having depending webs and segmental in form adapted to engage the roller and friction plate between the webs, substantially as described.

60. The combination, with a truck bearing having a friction plate, of an independently supported rub plate segmental in form and having depending webs adapted to engage the truck bearing and friction plate, substantially as described.

61. The combination, with a truck bearing having a roller and a bearing friction plate, of an independently supported rub plate segmental in form, having depending webs and an affixed rub friction plate, the friction plates, webs and roller engaging, substantially as described.

62. The combination, with a truck bearing having an apertured friction plate and an oil supply with a conductor leading to said friction plate, of an independently supported rub plate segmental in form, and having depending webs adapted to engage the friction plate and truck bearing between the webs, substantially as described.

63. The combination, with a truck bearing, of a vertically disposed spindle rotatively supported in the bearing, a roller rotatively supported about the spindle, and an independently supported rub plate having a depending web segmental in form adapted to engage the roller, substantially as described.

64. The combination, with a truck bearing, of a spindle and roller in the bearing, both being capable of independent movement, and an independently supported rub plate segmental in form and having a depending web adapted to engage the roller, substantially as described.

65. The combination, with a truck bearing, of a spindle and roller in the bearing, both being capable of independent movement, and an independently supported rub plate segmental in form and having depending webs adapted to embrace the roller, substantially as described.

66. The combination of the upper chord 1, of the casting B having the aperture 21, of the spindle 26 extending between the casting and chord and through the aperture, and the roller 24 on said spindle, substantially as described.

67. The combination of the upper chord 1, of the casting B having the aperture 21, of the spindle 26 extending between the casting and chord and through the aperture, and the roller 24 on said spindle resting on the upper chord, substantially as described.

68. The combination of the casting 49, having the ways 54, and the roller 56 on said ways, with the friction plate 66 suitably supported, substantially as described.

69. The combination of the casting 49, having the ways 54, and the roller 56 on said ways, with the superposed plate 59 having the segmental friction plate 66 in contact with the said roller, substantially as described.

70. The combination with the casting 49 having the segmental bearing surface 58, of the superposed plate 59, having the bracket 61, and a roller 62 journaled in said bracket adapted to bear on the said bearing surface, substantially as described.

71. The combination with the casting 49 having the ways 54, roller 56 on said ways, and the segmental bearing surface 58, of the superposed plate 59 having the bracket 61 and journaled roller 62 therein, and the friction plate 66, the roller 62 bearing against the said segmental surface, and the friction plate bearing on the roller 56, substantially as described.

72. The combination with the casting 49 having the segmental bearing surfaces 58, 58$^a$, of the superposed plate 59, having the brackets 61, 61$^a$, and rollers 62, 62$^a$ journaled therein and adapted to bear on the said bearing surfaces, substantially as described.

73. The combination with the casting 49 having the ways 54, roller 56 on said ways, and the segmental bearing surfaces 58, 58$^a$, of the superposed plate 59 having the brackets 61, 61$^a$, with the rollers 62, 62$^a$ journaled therein, and the friction plate 66, the rollers 62, 62$^a$ bearing against the said segmental surfaces, and the friction plate bearing on the roller 56, substantially as described.

74. The plate 59 having the downwardly extending brackets 61 61$^a$, the bolts 63, 63$^a$ passing through said brackets, and the cross bar 68, uniting said bolts, substantially as described.

75. The combination with the castings B having the apertured lug 17, of the truck frame having spring posts, and an upper chord, said posts passing through the said lugs and having nuts on the end for holding said castings down on the chord, substantially as described.

Signed at the city of Philadelphia, county of Philadelphia, and State of Pennsylvania, this 25th day of July, 1892.

JOHN A. BRILL.
WALTER S. ADAMS.

Witnesses:
HENRY C. ESLING,
HOWARD H. DICKEY.